US008614803B2

(12) United States Patent (10) Patent No.: US 8,614,803 B2
Inui et al. (45) Date of Patent: Dec. 24, 2013

(54) USER INTERFACE OF IMAGE FORMING APPARATUS WITH RESTRICTED EDITING FUNCTION

(75) Inventors: Kazuo Inui, Itami (JP); Kimie Mishima, Itami (JP); Yoshiki Tokimoto, Nishiwaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1037 days.

(21) Appl. No.: 11/237,782

(22) Filed: Sep. 29, 2005

(65) Prior Publication Data

US 2006/0221355 A1 Oct. 5, 2006

(30) Foreign Application Priority Data

Mar. 29, 2005 (JP) ................................. 2005-094109

(51) Int. Cl.
*G06K 15/00* (2006.01)
*G06F 3/12* (2006.01)

(52) U.S. Cl.
USPC ........ 358/1.14; 358/1.15; 358/1.13; 358/1.18

(58) Field of Classification Search
USPC ................ 358/1.12–1.18; 715/825, 777, 804; 399/81, 82
See application file for complete search history.

(56) References Cited

U.S. PATENT DOCUMENTS

| 5,983,212 | A  | * | 11/1999 | Kataoka et al. ........................ 1/1 |
| 6,120,127 | A  | * | 9/2000  | Inoue et al. ...................... 347/37 |
| 6,333,752 | B1 | * | 12/2001 | Hasegawa et al. ............. 715/764 |
| 6,762,853 | B1 | * | 7/2004  | Takagi et al. ................. 358/1.15 |
| 6,816,273 | B1 | * | 11/2004 | Kuga et al. .................... 358/1.15 |
| 7,034,954 | B1 | * | 4/2006  | Utsunomiya ................. 358/1.16 |
| 7,046,258 | B1 | * | 5/2006  | Naito et al. .................... 345/619 |
| 7,120,910 | B2 | * | 10/2006 | Matsuda et al. .............. 718/102 |
| 7,159,190 | B2 | * | 1/2007  | Perry ............................. 715/825 |
| 2003/0188259 | A1 | * | 10/2003 | Aureglia et al. .............. 715/503 |
| 2004/0143566 | A1 | * | 7/2004  | Fukasawa ......................... 707/1 |
| 2004/0223177 | A1 | * | 11/2004 | Takagi et al. ................. 358/1.13 |
| 2006/0050297 | A1 | * | 3/2006  | Morikawa et al. ........... 358/1.15 |

FOREIGN PATENT DOCUMENTS

| JP | 10-051577     |   | 2/1998  |
| JP | 2000-322221   |   | 11/2000 |
| JP | 2003-189036   |   | 7/2003  |
| JP | 2004-013495   |   | 1/2004  |
| JP | 2004013495  A | * | 1/2004  |
| JP | 2004-094359   |   | 3/2004  |
| JP | 2004-112455   |   | 4/2004  |

OTHER PUBLICATIONS

Japanese Decision to Grant Patent mailed Aug. 26, 2008, directed to counterpart JP application No. 2005-094109; 6 pages.
Japanese Notification of Reasons for Refusal mailed Apr. 1, 2008, directed at counterpart JP application No. 2005-094109; 3 pages.
Japanese Notification of Reasons for Refusal mailed Jun. 17, 2008, directed at counterpart JP application No. 2005-094109; 3 pages.

* cited by examiner

*Primary Examiner* — Dov Popovici
(74) *Attorney, Agent, or Firm* — Morrison & Foerster LLP

(57) ABSTRACT

A user interface which displays information regarding a job registered in an image forming apparatus includes a job information acquisition unit which acquires information regarding the job, an editing function selection unit which acquires selection of an editing function to the information regarding the job by a user, a job information editing unit which carries out the selected editing function to the information regarding the job, limiting the editing of a predetermined item of the information regarding the job, and a job information display unit which displays the edited job information.

18 Claims, 13 Drawing Sheets

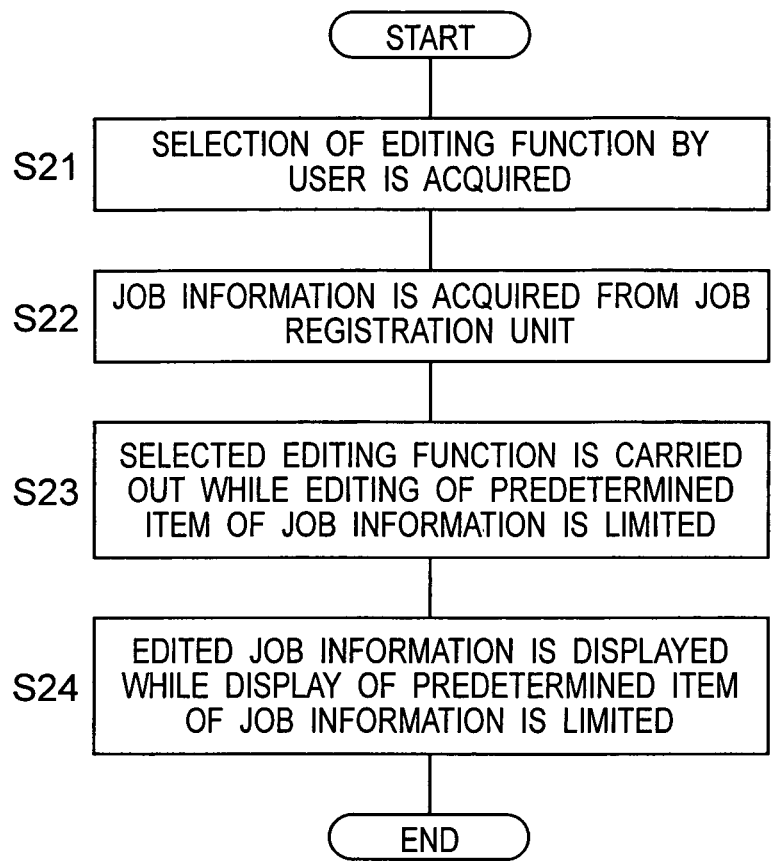

Fig. 7

| JOB CONFIRMATION | | PRINT | SCAN & TRANSMISSION | FAX TRANSMISSION | RECEPTION / STORING | END |
|---|---|---|---|---|---|---|
| ACTIVE LIST | HISTORY LIST | | STORED JOB | ACTIVE JOB | DELETE | |
| | | | | | PRIORITY OUTPUT | |

| No. | REGISTRATION SOURCE | STATE | DOCUMENT NAME | REGISTRATION TIME | ORIGINAL | PRINT COPY |
|---|---|---|---|---|---|---|
| 1111 | TAKAHASHI | PRINTING | Screen-specification.xls | 03/05/13 16:33 | 9000 | 9999 |
| 2222 | INUI | PRINTING STANDBY | Untitled.bmp | 03/05/13 16:33 | 12 | 4 |
| 3333 | FUJITA | PRINTING STANDBY | document.xls | 03/05/13 16:33 | 100 | 2 |
| 4444 | INUI | RECEIVING | Presentaion.ppt | 03/05/13 16:33 | 10 | 56 |

← →

SETTING CONFIRMATION

DETAIL

Fig. 8

| No. | REGISTRATION SOURCE | STATE | DOCUMENT NAME | REGISTRATION TIME | ORIGINAL | PRINT COPY |
|---|---|---|---|---|---|---|
| 1111 | **** | PRINTING | Screen-specification.xls | 03/05/13 16:33 | 9000 | 9999 |
| 2222 | INUI | PRINTING STANDBY | Untitled.bmp | 03/05/13 16:33 | 12 | 4 |
| 3333 | **** | PRINTING STANDBY | document.xls | 03/05/13 16:33 | 100 | 2 |
| 4444 | INUI | RECEIVING | Presentaion.ppt | 03/05/13 16:33 | 10 | 56 |

JOB CONFIRMATION — PRINT — SCAN & TRANSMISSION — FAX TRANSMISSION — RECEPTION / STORING

ACTIVE LIST — HISTORY LIST

STORED JOB — ACTIVE JOB

END — DELETE — PRIORITY OUTPUT — SETTING CONFIRMATION — DETAIL

Fig. 9

| JOB CONFIRMATION | | | | | | END |
|---|---|---|---|---|---|---|
| | | | | | DELETE | |
| | | PRINT | SCAN & TRANSMISSION | FAX TRANSMISSION | RECEPTION / STORING | |
| | | | | | PRIORITY OUTPUT | |
| ACTIVE LIST | HISTORY LIST | | STORED JOB | ACTIVE JOB | | |
| No. | REGISTRATION SOURCE | STATE | DOCUMENT NAME | REGISTRATION TIME | ORIGINAL | PRINT COPY |
| 1111 | TAKAHASHI | PRINTING | **** | **** | **** | **** |
| 2222 | INUI | PRINTING STANDBY | Untitled.bmp | 03/05/13 16:33 | 12 | 4 |
| 3333 | FUJITA | PRINTING STANDBY | **** | **** | **** | **** |
| 4444 | INUI | RECEIVING | Presentaion.ppt | 03/05/13 16:33 | 10 | 56 |

SETTING CONFIRMATION

DETAIL

*Fig. 10*

| JOB CONFIRMATION | | | | | | END | |
|---|---|---|---|---|---|---|---|
| | | PRINT | SCAN & TRANSMISSION | FAX TRANSMISSION | RECEPTION / STORING | DELETE | |
| ACTIVE LIST | HISTORY LIST | | STORED JOB | ACTIVE JOB | | PRIORITY OUTPUT | |

| No. | REGISTRATION SOURCE | STATE | DOCUMENT NAME | REGISTRATION TIME | ORIGINAL | PRINT COPY |
|---|---|---|---|---|---|---|
| 1111 | ***** | PRINTING | **** | **** | **** | **** |
| 2222 | INUI | PRINTING STANDBY | Untitled.bmp | 03/05/13 16:33 | 12 | 4 |
| 3333 | ***** | PRINTING STANDBY | ***** | ***** | **** | **** |
| 4444 | INUI | RECEIVING | Presentaion.ppt | 03/05/13 16:33 | 10 | 56 |

← →

SETTING CONFIRMATION    DETAIL

Fig. 12

| JOB CONFIRMATION | | | | | | END |
|---|---|---|---|---|---|---|
| | PRINT | SCAN & TRANSMISSION | FAX TRANSMISSION | RECEPTION / STORING | DELETE | |
| ACTIVE LIST | HISTORY LIST | | STORED JOB | ACTIVE JOB | PRIORITY OUTPUT | |
| No. | REGISTRATION SOURCE | STATE | DOCUMENT NAME | REGISTRATION TIME | ORIGINAL | PRINT COPY |
| 1111 | **** | PRINTING | **** | **** | **** | **** |
| 2222 | INUI | PRINTING STANDBY | Untitled.bmp | 03/05/13 16:33 | 12 | 4 |
| 3333 | **** | PRINTING STANDBY | **** | **** | **** | **** |
| 4444 | INUI | RECEIVING | Presentaion.ppt | 03/05/13 16:33 | 10 | 56 |
| | | | ← → | | SETTING CONFIRMATION | DETAIL |

USER INTERFACE OF IMAGE FORMING APPARATUS WITH RESTRICTED EDITING FUNCTION

This application is based on Japanese Patent Application No. 2005-94109 filed in Japan on Mar. 29, 2005, the contents of which are hereby incorporated by reference.

BACKGROUND OF THE INVENTION

1. Field of the Invention

The present invention relates to an user interface which displays information regarding a job such as printing, copying, faxing, scanning and the like from a plurality of users and an image forming apparatus including such user interface.

2. Description of the Related Art

An image forming apparatus has been increasingly shared by a plurality of users as an MFP (Multi-Function Product) which is provided every section in a company or connected to the network established in the company to perform scanning, faxing, mailing and the like as well as printing. Each user can register the job such as printing, scanning, faxing and the like in the image forming apparatus directly or through the network. Thus, each user can confirm an execution state of the job that the user registered, to the image forming apparatus directly or through the network, as shown in Japanese Patent Laid-open Publication No. 2004-94359.

However, since the image forming apparatus connected to the network such as a LAN can be accessed from the outside such as the Internet, confidential documents stored in the image forming apparatus could be accessed through the network. In this case, it becomes important to provide security on the network so as not to leak information of the confidential documents. Thus, it is necessary to ensure the security for the information regarding the job registered in the image forming apparatus which is connected to the network.

As described above, when each user confirms the execution state of the registered job, if information regarding a job registered by another user is displayed together, for example, a confidential document could be taken out by a user who is different from a user who registered its printing information because its printing timing can be seen in the display.

Meanwhile, there is a technique in which management information of a job is appropriately limited according to a confirming person, as shown in Japanese Patent Laid-open Publication No. 2003-189036.

However, when the job information which has been edited so as to be sorted in execution sequence of the jobs is displayed, for example, since all job information is sorted even if the display is limited, there is a problem in which the execution sequence of the jobs whose display is limited is revealed. As described above, according to the conventional technique, security when the information regarding the registered job is edited and security when the edited information is displayed are not considered.

SUMMARY OF THE INVENTION

It is an object of the present invention to provide an image forming apparatus in which security is improved when information regarding registered jobs is edited.

According to the present invention, a user interface which displays information regarding a job registered in an image forming apparatus, includes:

a job information acquisition unit which acquires information regarding the job;

an editing function selection unit which acquires selection of an editing function to the information regarding the job by a user;

a job information editing unit which carries out the selected editing function to the information regarding the job, limiting the editing of a predetermined item of the information regarding the job; and a job information display unit which displays the edited job information.

The job information editing unit can limit editing of a predetermined item of information regarding a job registered by a user other than the above user.

The job information display unit can display the edited job information, limiting a display of a predetermined item of the information regarding the job. In addition, the job information display unit may display the edited job information, limiting a display of a predetermined item of information regarding a job registered by a user other than the above user.

Furthermore, the editing function is a function which sorts a predetermined item of the information regarding the job, or a function which searches and retrieves a predetermined item of the information regarding the job, for example.

In addition, the user interface may be incorporated in an image forming apparatus comprising a print unit. The image forming apparatus includes:

an user interface which displays information regarding a job registered in an image forming apparatus, comprising:

a job information acquisition unit which acquires information regarding the job;

an editing function selection unit which acquires selection of an editing function to the information regarding the job by a user;

a job information editing unit which carries out the selected editing function to the information regarding the job, limiting editing of a predetermined item of the information regarding the job; and a job information display unit which displays the edited job information; and a print unit.

Further, the user interface may be incorporated in a user terminal comprising a communication interface which can be connected to the image forming apparatus through a network. The user terminal includes:

an user interface which displays information regarding a job registered in an image forming apparatus, comprising:

a job information acquisition unit which acquires information regarding the job;

an editing function selection unit which acquires selection of an editing function to the information regarding the job by a user;

a job information editing unit which carries out the selected editing function to the information regarding the job, limiting editing of a predetermined item of the information regarding the job; and a job information display unit which displays the edited job information; and a communication interface which can be connected to the image forming apparatus through a network.

According to the present invention, a job information display method of displaying information regarding a job registered in an image forming apparatus, includes:

acquiring the information regarding the job;

acquiring an editing function of the information regarding the job selected by a user;

carrying out the selected editing function of the information regarding the job, limiting editing of a predetermined item of the information regarding the job; and displaying the edited job information.

The step of editing the job information limits editing of a predetermined item of the information regarding the job registered by a user other than the above user.

In addition, the step of displaying the job information displays the edited job information, limiting a display of a predetermined item of the information regarding the job. Furthermore, the step of displaying the job information may display the edited job information, limiting a display of a predetermined item of the information regarding the job registered by a user other than the above user.

Still further, according to the present invention, a job information display program for causing a computer to execute each step of the job information display method of displaying information regarding a job registered in an image forming apparatus, including:

acquiring the information regarding the job;

acquiring an editing function of the information regarding the job selected by a user;

carrying out the selected editing function of the information regarding the job, limiting editing of a predetermined item of the information regarding the job; and displaying the edited job information.

In addition, the job information display program may be stored in a recording medium which can be read by a computer. According to the present invention, the recording medium, readable by a computer, which stores the job information display program for causing a computer to execute each step of the job information display method of displaying information regarding a job registered in an image forming apparatus, including:

acquiring the information regarding the job;

acquiring an editing function of the information regarding the job selected by a user;

carrying out the selected editing function of the information regarding the job, limiting editing of a predetermined item of the information regarding the job; and displaying the edited job information.

According to the user interface of the present invention, the selected editing function is carried out to the job information while the editing of the predetermined item of the information regarding the job is limited. Thus, the security can be provided for the job information at the time of the editing.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 6 is a flowchart of another method of editing the job information and displaying the edited job information according to the embodiment 1 of the present invention;

FIG. 7 is a display example of the job information when there is no display limit;

FIG. 8 is a display example of the job information when a display of a job registration source is limited;

FIG. 9 is a display example of the job information when a display of an item other than the registration source in the job information is limited;

FIG. 10 is a display example of the job information when a display of the job information of a user other than a job information editing user is limited;

FIG. 12 is a display example of the job information when a display of job information of a user other than the job information editing user is limited;

DESCRIPTION OF THE PREFERRED EMBODIMENTS

Figure 1:
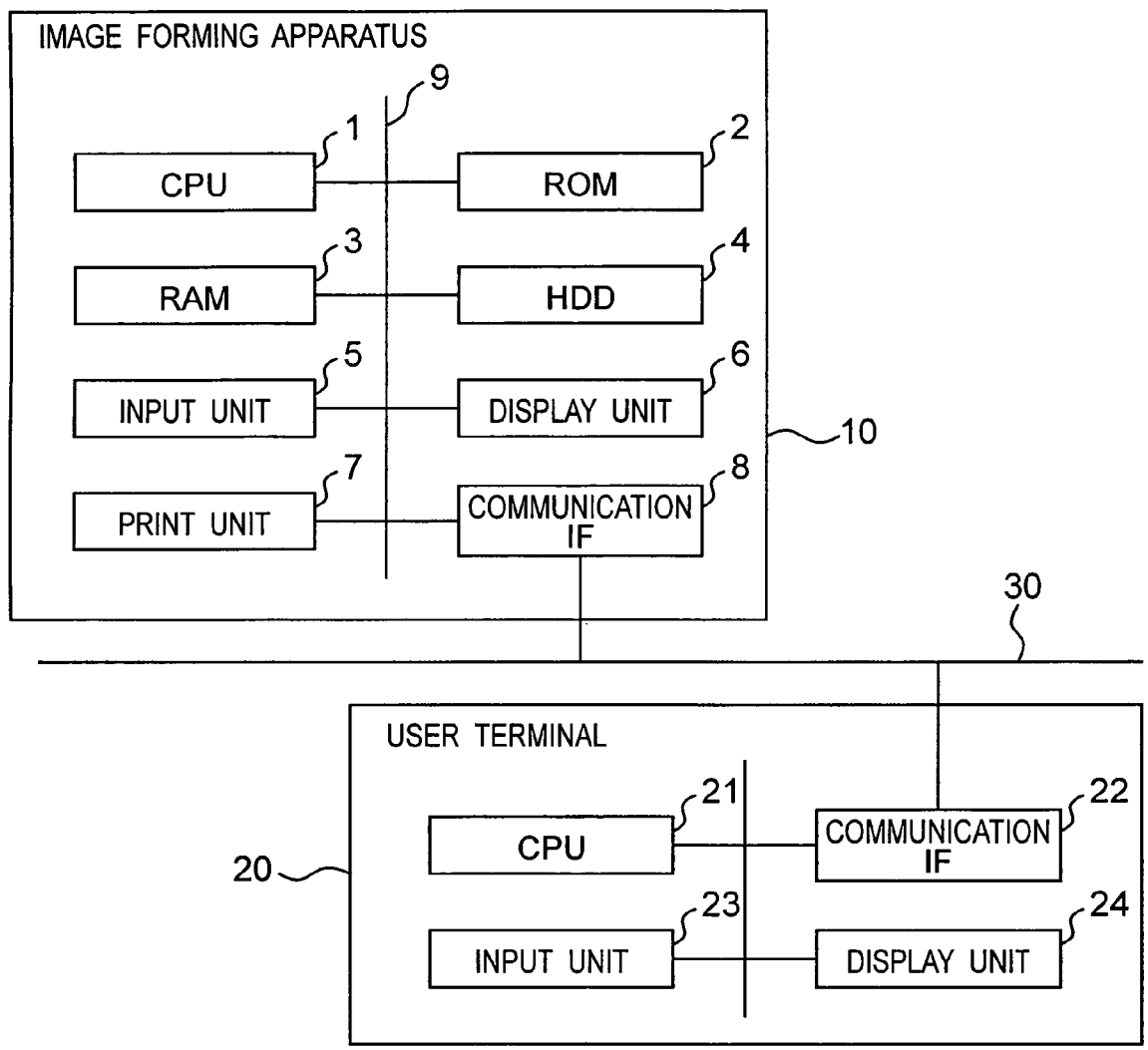
FIG. 1 is a block diagram showing a hardware constitution of an image forming apparatus according to an embodiment 1 of the present invention.

The user interface according to embodiments of the present invention will be described with reference to the accompanying drawings. In addition, the same reference numerals and signs are allotted to substantially the same member in the drawings.

Embodiment 1

Figure 2:
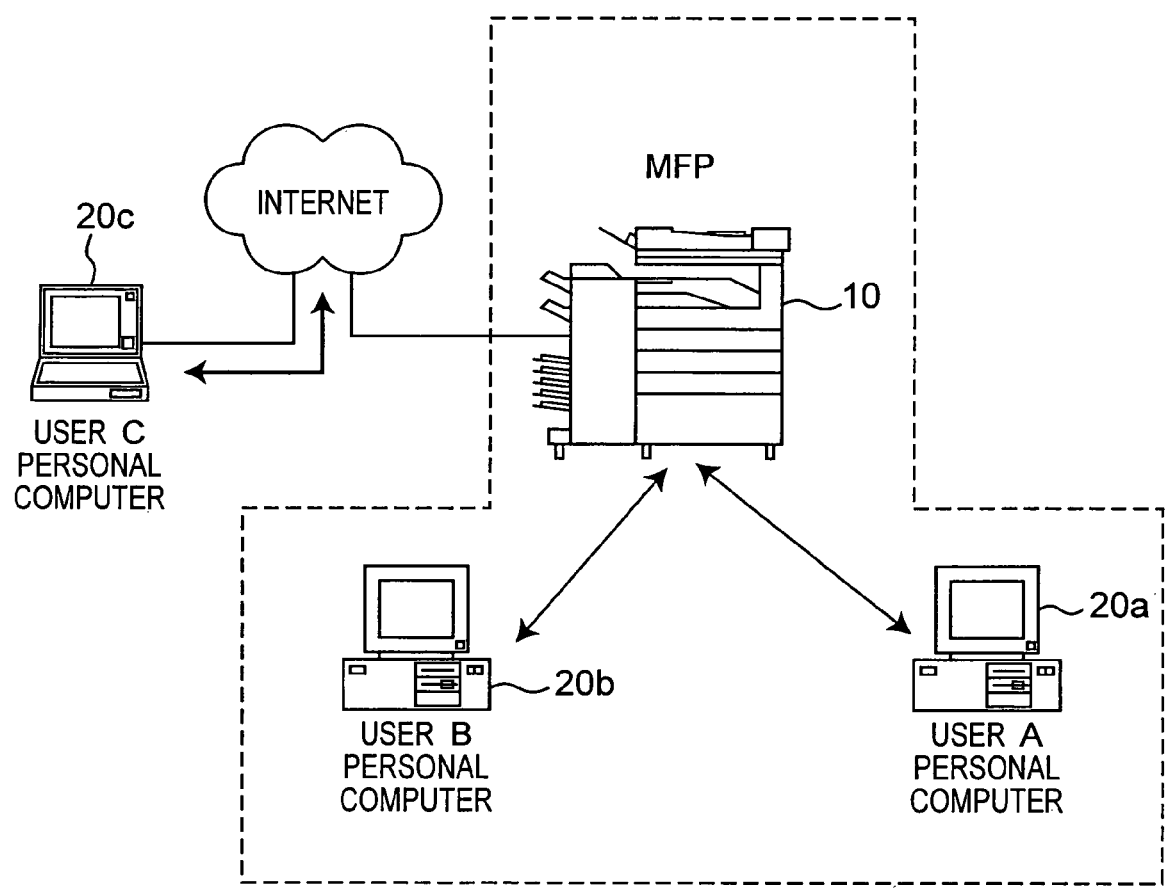
FIG. 2 is a conceptual view showing a network system comprising the image forming apparatus according to the embodiment 1 of the present invention.

FIG. 1 is a block diagram showing a hardware constitution of an image forming apparatus. In addition, FIG. 2 is a conceptual view showing a network system comprising an image forming apparatus (MFP) 10 and user terminals 20a, 20b and 20c. The image forming apparatus 10 comprises a CPU 1, a ROM 2, a RAM 3, a HDD 4, an input unit 5, a display unit 6, a print unit 7, a communication IF 8 which can be connected to a network 30, and a bus 9. The user terminal 20 comprises a CPU 21, a communication IF 22 which can be connected to the network 30, an input unit 23, and a display unit 24. In addition, as shown in FIG. 2, the image forming apparatus 10 can be connected to the users 20a and 20b through LAN and to which the user 20c can connect through the Internet.

Figure 3:
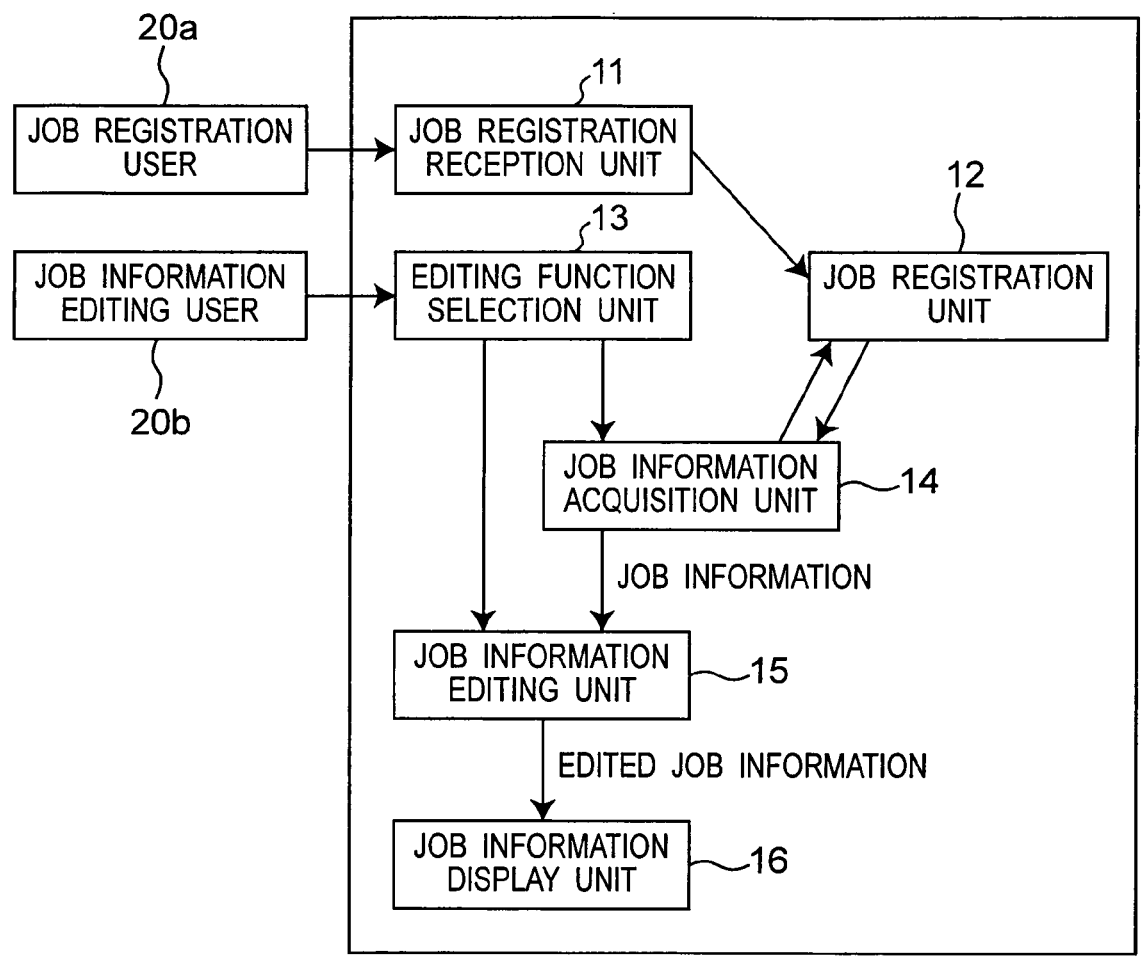
FIG. 3 is a block diagram showing a functional constitution of a user interface according to the embodiment 1 of the present invention.

FIG. 3 is a block diagram showing a functional constitution of a user interface according to an embodiment 1 of the present invention. The user interface may be incorporated in the image forming apparatus 10 comprising the print unit 7 or may be incorporated in the user terminal 20 comprising the communication interface 22 which can be connected to the image forming apparatus 10 through the network 30 shown in FIG. 1. The user interface comprises a job registration reception unit 11, a job registration unit 12, an editing function selection unit 13, a job information acquisition unit 14, a job information editing unit 15 and a job information display unit 16. The job registration reception unit 11 receives registration of a job from a job registration user 20a. In addition, the job registration user 20a may register the job to the user interface incorporated in the image forming apparatus 10 or may register the job to the user interface incorporated in the user terminal 20. In addition, the job registration unit 12 registers the received job. The editing function selection unit 13 acquires an editing function selected by a job editing user 20b. The job information acquisition unit 14 acquires job information from the job registration unit 12. The job information registration unit 15 carries out the selected editing function to the job information from the job information acquisition unit 14. At this time of editing, the editing is carried out while an editing of a predetermined item is limited. For example, a predetermined item of the job information of a user other than the user 20b who ordered the editing is excluded from the editing and when sorting is performed, it is not to be sorted and arranged at the end. The job information display unit 16 displays the edited job information. On this display, a display of a predetermined item in the job information is limited. For example, a predetermined item of the job information of the user other than the user 20b who ordered the editing is not displayed. According to this user interface, when the editing is carried out, the editing of the predetermined item is limited and the display of the predetermined item is limited. Thus, since the order of another user cannot be acquired from a result of the sorting which was carried out in execution sequence, security can be provided.

Figure 4:
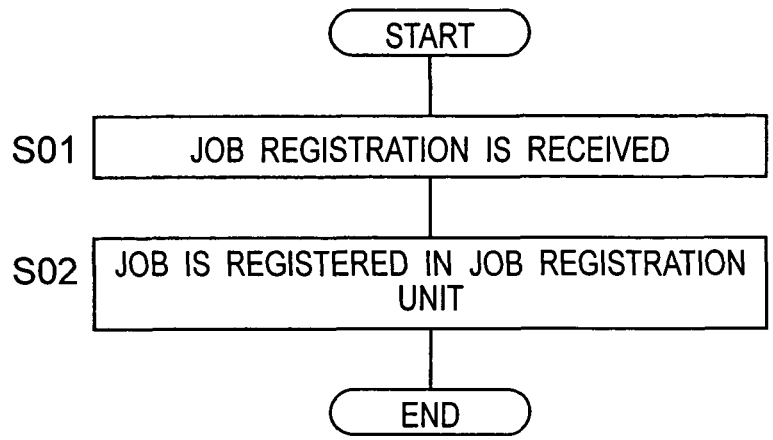
FIG. 4 is a flowchart when a job is registered.

FIG. 4 is a flowchart when the job is registered.

(a) Registration of the job from the job registration user 20a is received at S01. Here, the job is a print job, a scanner transmission job, a fax transmission job, a reception/storing job and the like. Since those are just examples, not limited to, another job may be included.

(b) The job is registered in the job registration unit 12 at S02. In the job registration unit 12, information regarding the job such as the kind of the job, a registration source of the job (for example, user name), a document name, a registration time, the number of originals, the number of print copies and the like is registered. Since the above job information is one example, not limited to, another item may be comprised. In addition, in the case of the job other than the printing job, still another item may be comprised.

Figure 5:
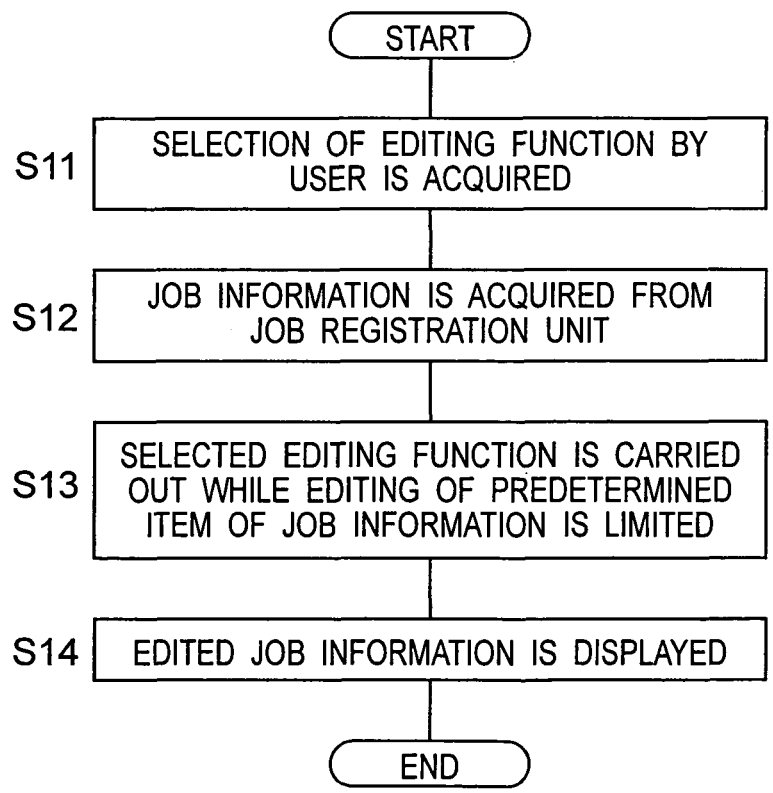
FIG. 5 is a flowchart of a method of editing job information and displaying the edited job information according to the embodiment 1 of the present invention.

FIG. 5 is a flowchart showing a method of editing the job information and displaying the edited job information according to the embodiment 1 of the present invention. It is noted that the job editing user 20b has been certified previously.

(a) The editing function selection unit 13 acquires the editing function selected by the job editing user 20b at step S11.

(b) The job information is acquired from the job registration unit 12 at S12.

(c) The selected editing function is carried out while the editing regarding the predetermined item of the job information is limited at step S13. For example, the predetermined item of the job information of the user other than the user 20b who selected sorting as the editing function is not object to be sorted and it is arranged at the end. It is noted that user identifying the user except for the user who orders to sort can be performed, for example, by comparing the certified user with the registration source registered at the same time of job registration.

(d) The edited job information is displayed at the job information display unit 16 at step S14.

According to the job information editing method, the editing is carried out while the editing of the predetermined item is limited. Thus, when the sorting is selected as the editing function, since the execution order of the jobs of another user cannot be acquired from the result of the sorting which was carried out in execution sequence, security can be provided.

FIG. 6 is a flowchart showing another example of the method of editing the job information and displaying the edited job information according to the embodiment 1 of the present invention. Also, it is noted that the job editing user 20b has been certified previously in this embodiment.

(a) The editing function selected by the user 20b is acquired at S21.

(b) The job information is acquired from the job registration unit 12 at S22.

(c) The selected editing function is carried out while the editing regarding the predetermined item of the job information is limited at S23.

(d) The edited job information is displayed while the editing of the predetermined item of the job information is limited at S24. For example, the predetermined item of the job information of the user other than the user 20b who selected sorting as the editing function is not to be displayed.

According to the job information editing method, the editing is carried out while the editing of the predetermined item is limited and the display of the predetermined item is limited. Thus, when the sorting is selected as the editing function, since the order of the jobs of another user cannot be acquired from a result of sorting which was carried out in execution sequence, security can be provided.

Example 1

A description will be made of a case where sorting is carried out as the editing function in the print job with reference to a display example. FIG. 7 is a display example of job information in a case a display is not limited. According to FIG. 7, the No., the registration source, the state, the document name, the registration time, the number of originals, the number of print copies of the jobs are displayed in the order of registration. Here, there are four print jobs are displayed. In addition, the job is not limited to the print job, and it may be the scanner transmission job, the fax transmission job, and reception/storing job. In addition, display examples when the display of the registration source of the job is limited (FIG. 8), when the display of the items other than the registration source in the job information is limited (FIG. 9), and when the display of the job information of the user other than the job information editing user is limited (FIG. 10) are shown as a reference.

Next, a description will be made of a case where the sorting is selected as the editing function in the print job shown in FIG. 7.

(a) A user "inui" orders the sorting of the registration sources in the job information.

(b) When the sorting is not limited, the registration sources arranged such that "Fujita"->"inui"->"Takahashi" or "Takahashi"->"inui"->"Fujita". Meanwhile, the editing for the job of the user other than "inui" who ordered the editing is limited here. Thus, only the registration source "inui" is to be sorted and the registration source is arranged first as the sorting result and the unsorted jobs of No. 1111 and No. 3333 are arranged in this order.

Figure 11:
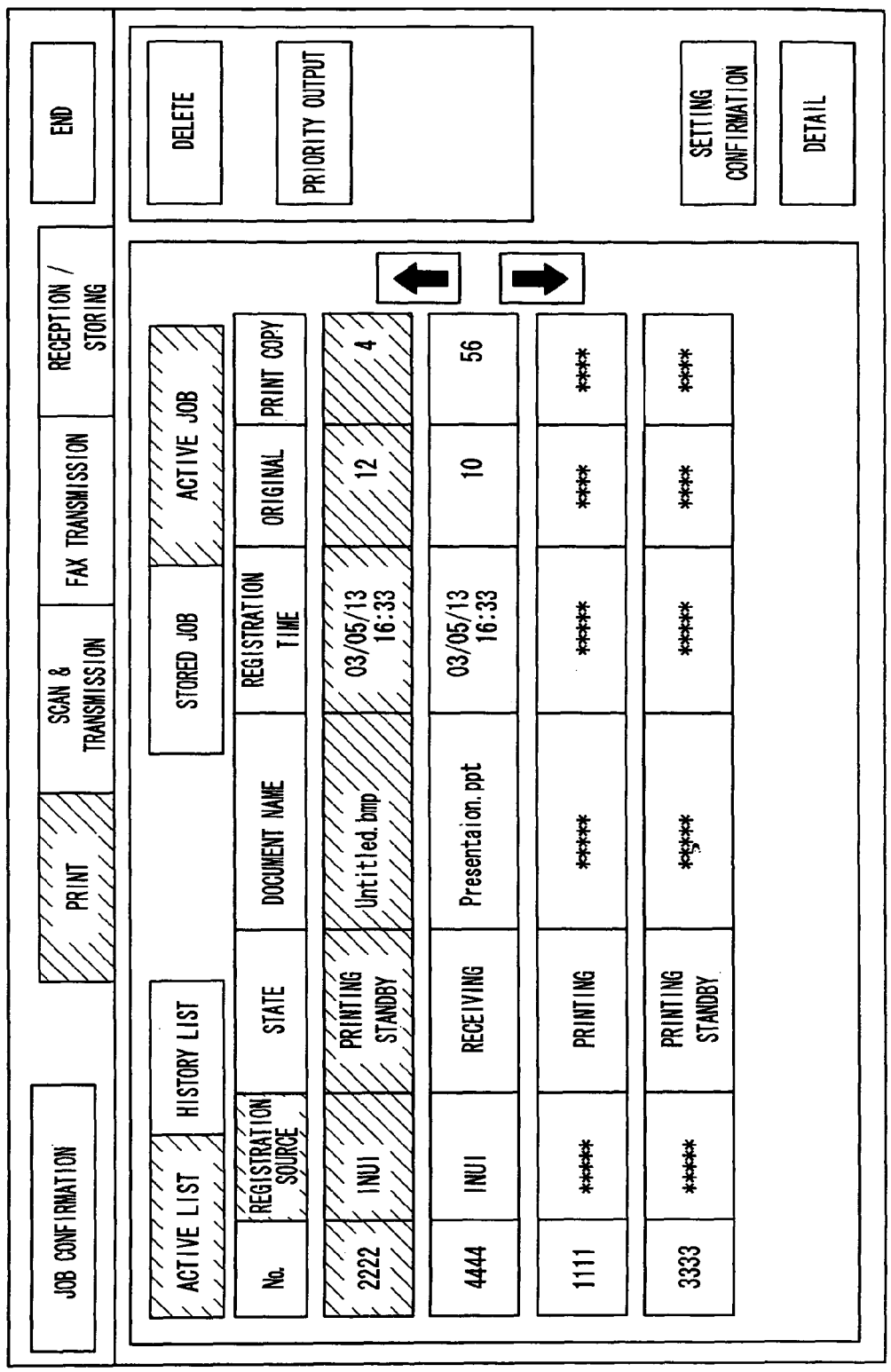
FIG. 11 is a display example of the job information after a sorting function is carried out as an editing function according to the embodiment 1 of the present invention.

(c) Since the display of the job information of the user other than the job information editing user is limited in the display of the sorting result, only the job information of the print job of the registration source "inui" is displayed and the job information of the other users are hidden as shown in FIG. 11.

Thus, even when the sorting regarding the registration source is performed, since the job of the users other than the "inui" who ordered the sorting is not to be sorted, the registration source cannot be specified and the number of the jobs of the others cannot be acquired. As a result, security can be provided.

Example 2

Next, a description will be made of a case where a search function is carried out as the editing function in the print job shown in FIG. 7 with reference to a display example.

(a) The user "inui" orders searching of the print job which is in a "printing standby" state among the job information.

In the following search function, when there is no editing limit, states (b1) and (c2) are provided and when there is an editing limit, states (b2) and (c2) are provided.

(b1) When there is no editing limit for the state, jobs No. 2222 and No. 3333 are listed as the print jobs in the "printing standby" state.

Figure 13:
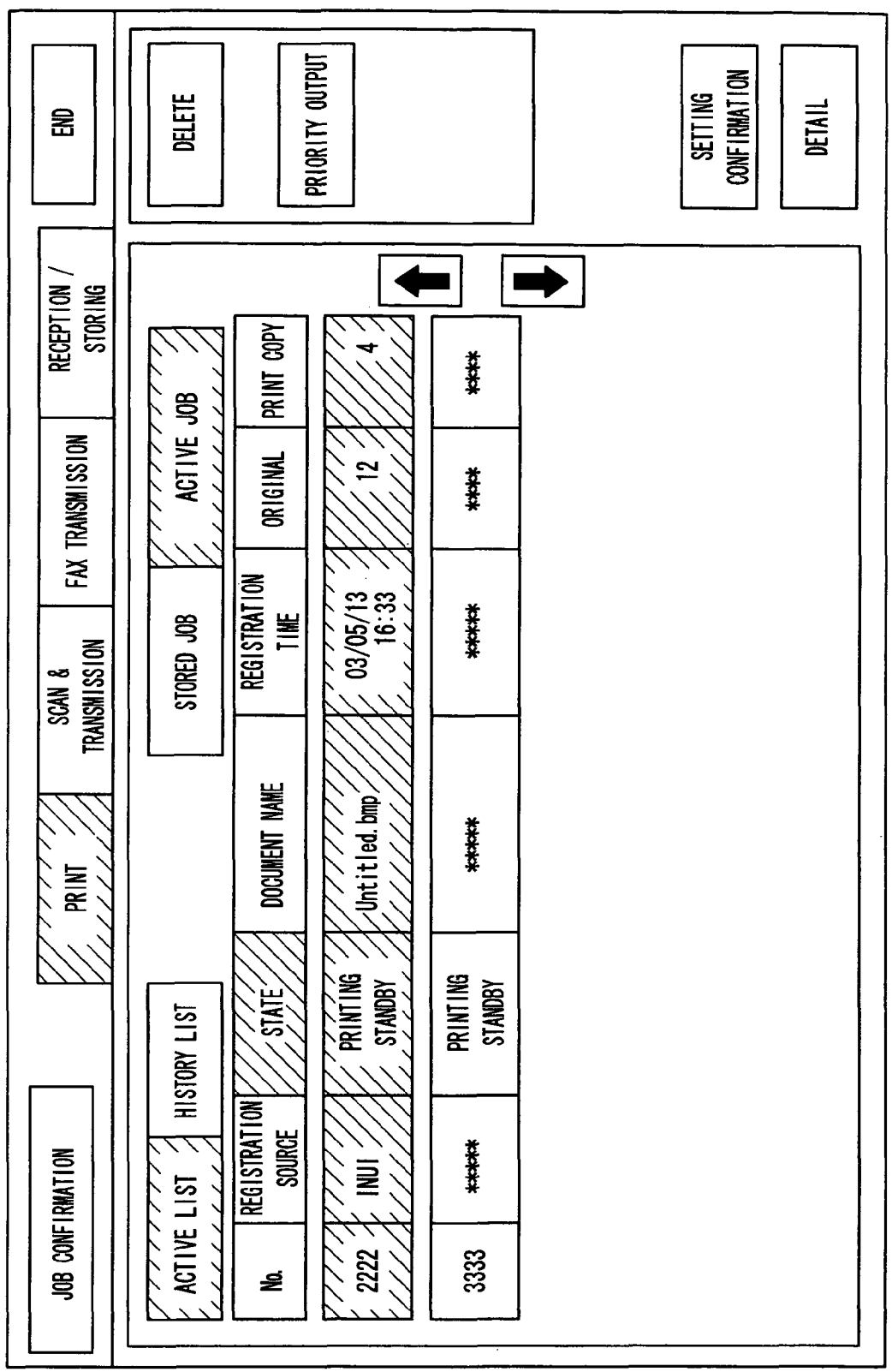
FIG. 13 is a display example of the job information after a search function of a "printing standby" state as an editing function is carried out according to an embodiment 2 of the present invention.

(c1) In the display of the searched result in this case, since the display of the job information of the user other than the job information editing user is limited, only the job information of the print job of the registration source "inui" is displayed and the job information of No. 3333 is hidden as shown in FIG. 13.

Figure 14:
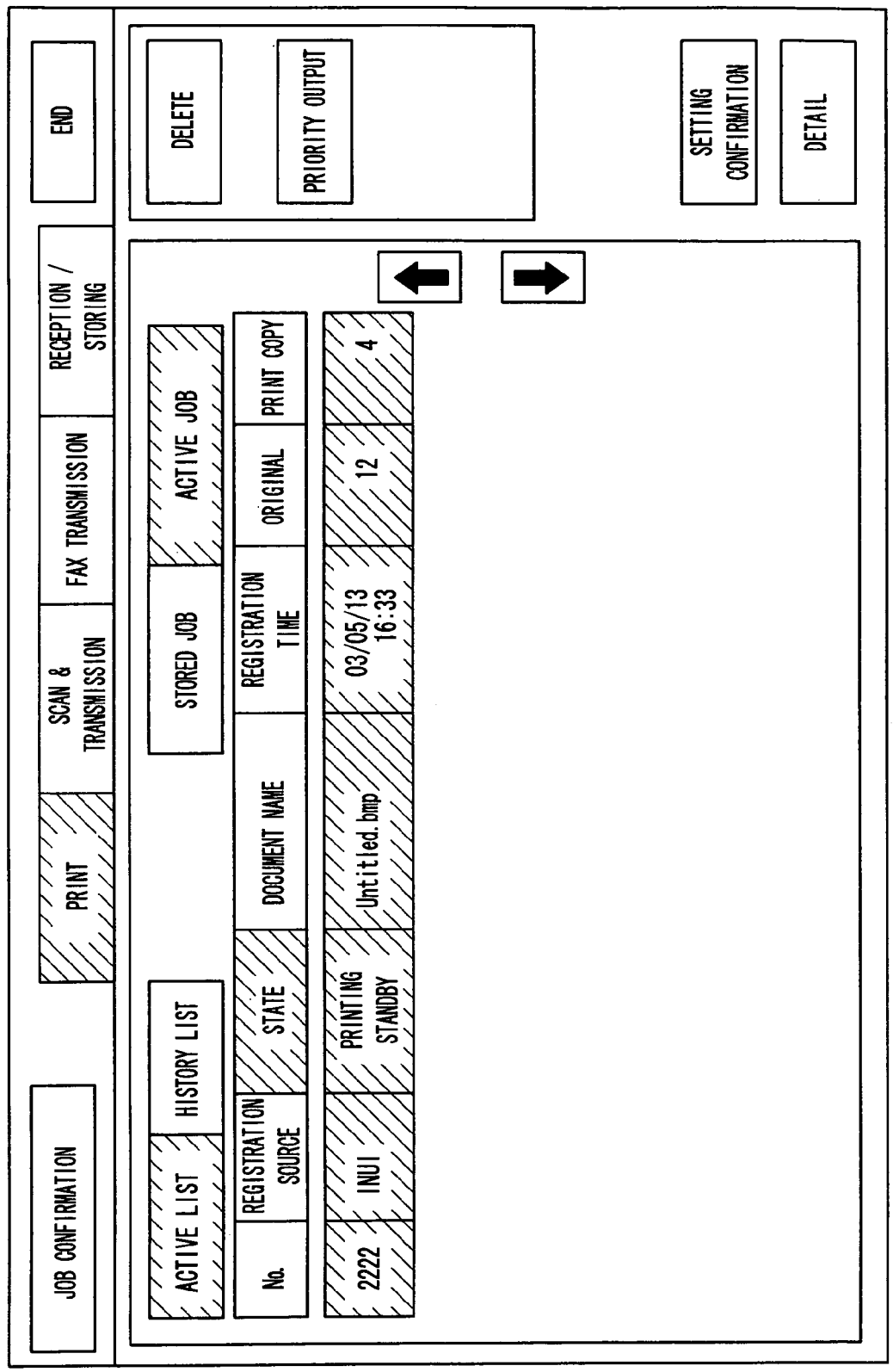
FIG. 14 is a display example of the job information after the search function of the "printing standby" state is carried out as the editing function in a case the job information of a user other than a job information editing user is not displayed according to the embodiment 2 of the present invention.

(b2) Meanwhile, when there is an editing limit for the state, the editing of the job of the user other than "inui" who ordered the editing is limited. Therefore, the print job of No. 3333 is not an object to be searched and the searched result is the only the print job of No. 2222 in the "print standby" state of "inui" who is the job information editing user as shown in the display example in FIG. 14.

(c2) In the display of the searched result, since the display of the job information of the user other than the job information editing user is limited, only the print job of No. 2222 is displayed.

Thus, since the editing of the job of the user other than the user who ordered the editing is limited, it is not the object to be edited. As a result, there can be provided security.

According to the above embodiments and the examples, the user who edits the job information certifies the user before the editing. For example, the user is certified by a certification unit provided inside or the outside inputting an ID and a password. Thus, the user certified by the certification unit can edit or display the above job information as the user who can order the editing.

Since the user interface according to the present invention can display the information regarding the job registered in the image forming apparatus, it can be incorporated in the image forming apparatus. Alternatively, it can be incorporated in a user terminal comprising a communication interface which can be connected to the image forming apparatus through the network.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A user interface, comprising:
a job information acquisition unit which acquires job information which comprises one or more items including a state according to a job processed with an image forming apparatus;
a job information display unit which displays the job information acquired by the job information acquisition unit;
an editing function selection unit which acquires instructions by a user of sorting or search based on first information for a first item included in the job information about the job displayed on the job information display unit;
a job information editing unit which performs sorting or search based on the instructions acquired by the editing function selection unit;
wherein the job information display unit displays second information according to a job which has second information for a second item included in the job information in a display of a result by the job information editing unit, and hides at least information for the second item according to the job on which the information for the second item is not the second information.

2. The user interface according to claim 1, wherein the job information display unit hides the information for the second item by displaying a predetermined character instead of the information for the second item that is not the second information.

3. The user interface according to claim 1, wherein the second item is a source of the job, and the second information indicates a user certified before sorting or searching based on the instructions.

4. The user interface according to claim 1, wherein the editing function selection unit acquires the instructions for sorting jobs displayed on the job information display unit so that the job having first information for a first item included in the job information is arranged first.

5. The user interface according to claim 1, wherein the editing function selection unit acquires the instructions for search first information by first item included in the job information according to the job information displayed on the job information display unit.

6. The user interface according to claim 1, wherein the job information editing unit restricts the sorting or the search where the job is registered by another user.

7. An image forming apparatus, comprising:
a job information acquisition unit which acquires job information which comprises one or more items including a state according to a job processed with the image forming apparatus;
a job information display unit which displays the job information acquired by the job information acquisition unit;
an editing function selection unit which acquires instructions by a user of sorting or search based on first information for a first item included in the job information about the job displayed on the job information display unit;
a job information editing unit which performs sorting or search based on the instructions acquired by the editing function selection unit; and
a print unit,
wherein the job information display unit displays second information according to a job which has second information for a second item included in the job information in a display of a result by the job information editing unit, and hides at least information for the second item according to the job on which the information for the second item is not the second information.

8. The image forming apparatus according to claim 7, wherein the job information display unit hides the information for the second item by displaying a predetermined character instead of the information for the second item that is not the second information.

9. The image forming apparatus according to claim 7, wherein the second item is a source of the job, and the second information indicates a user certified before sorting or searching based on the instructions.

10. The image forming apparatus according to claim 7, wherein the editing function selection unit acquires the instructions for sorting jobs displayed on the job information display unit so that the job having first information for a first item included in the job information is arranged first.

11. The image forming apparatus according to claim 7, wherein the editing function selection unit acquires the instructions for search first information by first item included in the job information according to the job information displayed on the job information display unit.

12. The image forming apparatus according to claim 7, wherein the job information editing unit restricts the sorting or the search where the job is registered by another user.

13. A non-transitory recording medium, readable by a computer, which stores a job information display program for causing the computer to execute each step of a job information display method of displaying information regarding a job registered in an image forming apparatus, comprising:

acquiring job information which comprises one or more items including a state according to a job processed with the image forming apparatus;

displaying the job information acquired by the acquiring job information step;

acquiring instructions by a user of sorting or search based on first information for a first item included in the job information about the job displayed;

performing sorting or search based on the instructions acquired by the acquiring instructions step; and wherein, in the course of the displaying step, displaying second information according to a job which has second information for a second item included in the job information in a display of a result by the performing sorting or search step, and hiding at least information for the second item according to the job on which the information for the second item is not the second information.

14. The non-transitory recording medium, readable by the computer, according to claim 13, wherein in the course of the displaying step, hiding the information for the second item by displaying a predetermined character instead of the information for the second item that is not the second information.

15. The non-transitory recording medium, readable by the computer, according to claim 13, wherein the second item is a source of the job, and the second information indicates a user certified before sorting or searching based on the instructions.

16. The non-transitory recording medium, readable by the computer, according to claim 13, wherein in the course of the acquiring step, acquiring the instructions for sorting jobs displayed on the displaying step so that the job having first information for a first item included in the job information is arranged first.

17. The non-transitory recording medium, readable by the computer, according to claim 13, wherein the acquiring instructions step acquires the instructions for searching first information by first item included in the job information according to the job information displayed on the job displaying step.

18. The non-transitory recording medium, readable by the computer, according to claim 13, wherein in the course of the performing sorting or search step, restricting the sorting or the search where the job is registered by another user.

* * * * *